United States Patent [19]

Yokotani et al.

[11] Patent Number: 5,036,424
[45] Date of Patent: Jul. 30, 1991

[54] MULTILAYER CERAMIC CAPACITIVE ELEMENT

[75] Inventors: Yoichiro Yokotani, Suita; Hiroshi Kagata, Katano; Junichi Kato, Osaka; Seiichi Nakatani, Hirakata; Yukio Terada, Neyagawa, all of Japan

[73] Assignee: Matsushita Electric Industrial Co., Ltd., Osaka, Japan

[21] Appl. No.: 525,024

[22] Filed: May 18, 1990

[30] Foreign Application Priority Data

May 18, 1989 [JP] Japan .................. 1-124830

[51] Int. Cl.⁵ .............................................. H01G 4/10
[52] U.S. Cl. ................................... 361/321; 29/25.42
[58] Field of Search ............... 29/25.42; 361/308, 309, 361/310, 320, 321, 328, 329, 330

[56] References Cited

U.S. PATENT DOCUMENTS

| | | | |
|---|---|---|---|
| 4,063,341 | 12/1977 | Bouchard et al. | 29/25.42 |
| 4,714,570 | 12/1987 | Nakatani et al. | 252/518 |
| 4,855,266 | 8/1989 | Burn | 361/321 X |
| 4,885,661 | 12/1989 | Yokotani et al. | 361/321 |

Primary Examiner—Donald A. Griffin
Attorney, Agent, or Firm—Wenderoth, Lind & Ponack

[57] ABSTRACT

A multilayer ceramic capacitor comprises plural ceramic dielectric layers laminated one on another, and at least two internal electrodes separated by the ceramic dielectric layer and alternately terminated at the opposite sides of the laminated ceramic dielectric layers. The ceramic dielectric layers is composed of a complex oxide including a component (A), a component (B) and copper, wherein the component (A), is at least one element selected from the group consisting of Pb, Ca, Sr and Ba, but contains Pb at the least, wherein the component (B) is at least two elements selected from the group consisting of Mg, Ni, Zn, Ti, Ta, Nb and W, the molar ratio of the component (A) to component (B) being not less than 0.985, but not more than 1.110, and wherein the content of said copper in the complex oxide is more than 0.650 wt %, but not more than 2.200 wt % in terms of $Cu_2O$. The internal electrodes are composed of copper or an alloy mainly comprising copper.

1 Claim, 1 Drawing Sheet

MULTILAYER CERAMIC CAPACITIVE ELEMENT

BACKGROUND OF THE INVENTION

1. Field of the Invention

The present invention relates to a multilayer capacitive element and a method for its production. More particularly, it relates to a multilayer ceramic capacitive element utilizing a lead-based complex perovskite for forming dielectric layers and comprising internal electrodes of copper or an alloy mainly comprising copper. Moreover, the invention relates to a method for manufacturing such multilayer capacitive elements.

2. Description of the Prior Art

Recently, multilayer ceramic capacitors have been widely popularized as there is an increasing demand for small-sized, large capacitance capacitors with severe requirements for size reductions of electronic devices as well as with increase in operating frequencies of electronic devices. In general, such a multilayer ceramic capacitor comprises a plurality of ceramic dielectric layers laminated one on another, and a plurality of internal electrodes separated by the ceramic dielectric layer and alternately terminated at opposite sides of the laminated ceramic dielectric layers.

In the production of such multilayer capacitors, green ceramic sheets are respectively applied with an internal electrode, laminated on one another, and then fired with internal electrodes at a sintering temperature of the dielectric ceramic material. Since the dielectric material conventionally used for multilayer capacitors are of a barium titanate system which has a sintering temperature of about 1300° C., and since the internal electrodes are subjected to such a high sintering temperature, it is required to use, as a material for internal electrodes, a metal which does not react with dielectric and which has a high melting point and high resistance to oxidation. For that reason, noble metals such as gold, platinum, palladium and the like have widely been used for the internal electrodes. However, use of such a noble metal has led to increase in production cost of multilayer ceramic capacitors.

To solve that problem, it has recently proposed to produce multilayer ceramic capacitors utilizing a low sintering dielectric ceramic material together with an inexpensive internal electrode material. For example, Japanese patent application laid-open No. 62-210613 and No. 63-265412, and U.S. Pat. No. 4,752,858 disclose a multilayer ceramic capacitor comprising a plurality of dielectric layers of a lead-based complex perovskite, and internal electrode layers composed of copper or an alloy mainly containing copper, said lead-based complex perovskite containing a component (A) and a component (B), the component (A) being the one selected from the group consisting of Pb, Ca, Sr and Ba, but containing Pb at the least, the component (B) being at least two elements selected from the group consisting of Mg, Ni, Zn, Ti, Ta, Nb and W, the molar ratio of said component (A) to component (B), i.e., A/B, being not less than 1.00. In addition to the above application and patent, Japanese patent applications laid-open Nos. 62-115817, 62-128513 and 62-203321 each discloses a method for production of such multilayer ceramic capacitors.

The dielectric ceramic materials of the prior art can be fired at a relatively low sintering temperature of less than 1080° C. in a reducing atmosphere, thus making it possible use copper or its alloy as a material for internal electrodes. It is, however, difficult to obtain dense ceramic dielectric which possess high specific resistance even at high temperatures, thus making it impossible to produce multilayer ceramic capacitors which possess high reliability even at high temperatures and high humidities.

To solve this problem, it has been proposed to incorporate a small amount of copper oxides (namely, 0.03 to 0.65 wt % in terms of $Cu_2O$) into the above lead-based complex perovskite dielectric material, for example, in U.S. Pat. No. 4,885,661.

In the production of such multilayer capacitors, however, it is required to fire the capacitors in a reducing atmosphere containing a reducing gas such as, for example, hydrogen, carbon monoxide, ammonia or the like with a low partial pressure of oxygen, as well as that disclosed in the above Japanese patent applications. For that reason, it is required to keep the partial pressure of oxygen in the firing atmosphere constant, thus making it considerably difficult to control the firing atmosphere. This may result in failure of mass production of multilayer ceramic capacitors with high reliability.

One idea to solve that problem is to fire green multilayer ceramic capacitors in a neutral atmosphere consisting essentially of nitrogen, but this has lead to problems. If the multilayer ceramic capacitors are fired in the nitrogen atmosphere, a part of copper in the electrode layers diffuses into the dielectric layers through the contacting surface between them during firing, resulting in a considerable difference in the content of copper oxides between the contacting and noncontacting areas of each dielectric layer with the electrode layer. Such a difference in the content of copper oxides causes production of cracks in the dielectric layers, and has led to decrease in the life characteristics of capacitors under the conditions of a high temperature and a high humidity.

SUMMARY OF THE INVENTION

It is therefore an object of the present invention to provide a multilayer ceramic capacitor which can be fired with internal electrodes of copper or a copper alloy in a neutral atmosphere, without lowering the life characteristics.

Another object of the present invention is to provide a multilayer ceramic capacitor which is excellent in electrical properties including life characteristics and in mass-productivity.

Still another object of the present invention is to provide a method for manufacturing such multilayer ceramic capacitors, which is easy to control the firing atmosphere, is simple to operate, and makes it possible to produce multilayer ceramic capacitors with high reliability.

These and other objects of the present invention are achieved by providing a multilayer ceramic capacitor comprising plural ceramic dielectric layers laminated one on another, and at least two internal electrodes separated by the ceramic dielectric layer and alternately terminated at the opposite sides of the laminated ceramic dielectric layers, said ceramic dielectric layers being composed of a complex oxide including a component (A), a component (B), and copper, said component (A) being at least one element selected from the group consisting of Pb, Ca, Sr and Ba, but containing Pb at the least, said component (B) being at least two elements selected from the group consisting of Mg, Ni, Zn, Ti, Ta, Nb and W, the molar ratio of said component (A) to component (B) being not less than 0.985, but not more than 1.110, the content of said copper in said complex oxide being more than 0.650 wt %, but not more than 2.200 wt % in terms of $Cu_2O$, said internal electrodes being composed of copper or an alloy mainly comprising copper.

The molar ratio of said component (A) to component (B), i.e., A/B, has been limited to a value within the range, $0.985 \leq A/B \leq 1.110$, for the following reasons. If the A/B ratio is less than 0.985 or exceeds 1.110, the specific resistance becomes lowered and less than $10^{10}$ Ω-cm.

The reasons why the content of copper which is present in the form of oxides in the complex oxide has been limited within the range of more than 0.650 wt % to not more than 2.200 wt % in terms of $Cu_2O$, are as follows. If the content of copper oxides is not more than 0.650 wt %, the life characteristics of the produced capacitors become lowered. If the content of copper exceeds 2.200 wt %, dielectric loss and insulating resistance become lowers considerably.

According to the present invention, the above multilayer ceramic capacitors may be produced by a method comprising the steps of preparing green multilayer ceramic capacitor chips with plural internal electrode paste layers including copper oxides and being separated by the green ceramic layer; heat-treating said green capacitor chips at a temperature lower than that of firing in a reducing atmosphere to convert said internal electrode paste layers to internal electrode layers by reduction of copper oxides to metal copper, and then firing the green capacitor chips, wherein said green capacitor chips are heat-treated at a temperature within a range of 110° to 300° C., and fired in a neutral atmosphere of nitrogen with a content of oxygen being not more than 0.100%.

The thus produced multilayer ceramic capacitors of the present invention, possess excellent initial characteristics and excellent life characteristics as the ceramic dielectric produced under the above conditions is a dense sintered body and possesses excellent dielectric characteristics and high resistivity.

According to the present invention, it is possible to prevent the ceramic dielectric from reduction during formation of the internal electrode layers as the heat-treatment for reducing copper oxides in the internal electrode layers to metal copper is carried out at low temperatures of not more than 300° C. Also, it is possible to prevent the dielectric layers from formation of cracks even if the green capacitor chips are fired in a neutral atmosphere of nitrogen with a very low partial pressure of oxygen. Since the dielectric layers contains relatively large amount of copper oxides, it is possible to minimize the difference in the copper content between the contacting area and noncontacting area of the dielectric layer with the internal electrode layer even if the reduced copper of the internal electrode layers is partially oxidized and diffused into the ceramic dielectric layers during firing. Also, the dielectric layers are improved in denseness and in adhesion to the internal electrode because of the diffusion of copper oxides into the dielectric layers, thus making it possible to produce multilayer ceramic capacitors with desired characteristics. Further, the firing is carried out in the neutral atmosphere of nitrogen, there is no need to supply any reducing gases to the firing atmosphere, thus making it easy to control the firing atmosphere as well as to mass produce multilayer capacitors with high reliability.

The above and other objects, features and advantages of the present invention will become more apparent from the following description, taken in conjunction with the accompanying drawing which shows, by way of example only, one preferred embodiment thereof.

DETAILED EXPLANATION OF THE PREFERRED EMBODIMENTS

Figure 1:
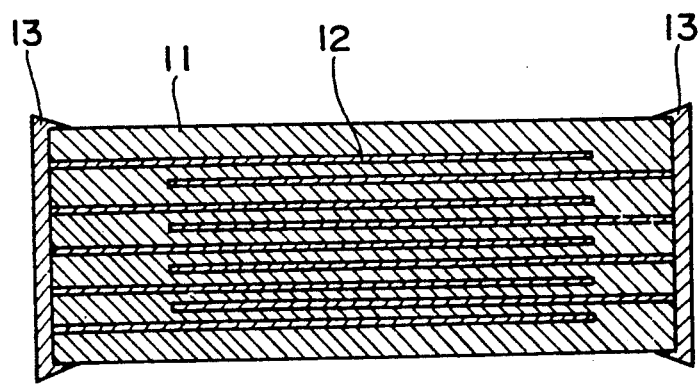
FIG. 1 is a section view showing a general construction of a multilayer ceramic capacitor embodying the present invention.

Referring now to FIG. 1, there is shown a multilayer ceramic capacitor which comprises plural ceramic dielectric layers 11 laminated one on another, plural internal electrodes 12 separated by each dielectric ceramic layer 11 and alternately terminated at opposite sides of the laminated ceramic dielectric layers 11, and external electrodes 13 formed on opposite sides of the laminated dielectric layers. The alternate internal electrodes 12 are connected to one external electrode 13 on one side of the laminated dielectric layers, whereas the other alternate internal electrodes 12 are connected to the other external electrode 13 on the opposite side of the laminated dielectric layers.

According to the present invention, the ceramic dielectric layers 11 are made up of a dielectric ceramic which consists essentially of a complex oxide of a lead-based complex perovskite including a component A, a component B, and copper. The component A is at least one element selected from the group consisting of Pb, Ca, Sr and Ba, but contains Pb at the least, whereas the component B is at least two elements selected from the group consisting of Mg, Ni, Zn, Ti, Ta, Nb and W. The molar ratio of said component A to component B is so determined that the A/B ratio is not less than 0.985, but not more than 1.110. The content of copper which is present in the form of oxides in the complex oxide is so determined that the copper oxides in the complex oxide is more than 0.650 wt %, but not more than 2.200 wt % in terms of $Cu_2O$.

The internal electrodes are composed of copper or an alloy mainly comprising copper, and are formed by reducing copper oxides with or without one or more alloying elements such as silver for example.

EXAMPLE 1

Using a dielectric ceramic composition consisting essentially of a basic dielectric ceramic composition expressed by the following chemical formula, A, B, C or D and copper oxides incorporated therein, there were prepared multilayer ceramic capacitors in the following manner.

A: $Pb_{1.03}(Mg_{\frac{1}{3}}Nb_{\frac{2}{3}})_{0.08}Ti_{0.14}(Ni_{\frac{1}{2}}W_{\frac{1}{2}})_{0.06}O_{3.03}$
B: $(Pb_{0.96}Sr_{0.07})(Ni_{\frac{1}{2}}Nb_{\frac{2}{3}})_{0.62}Ti_{0.38}O_{3.03}$
C: $(Pb_{1.00}Ca_{0.03})(Mg_{\frac{1}{3}}Nb_{\frac{2}{3}})_{0.40}Ti_{0.38}(Zn_{\frac{1}{2}}W_{\frac{1}{2}})_{0.30}O_{3.03}$
D: $(Pb_{0.87}Ba_{0.18})(Zn_{\frac{1}{3}}Nb_{\frac{2}{3}})_{0.70}Ti_{0.20}(Mg_{\frac{1}{2}}W_{\frac{1}{2}})_{0.10}O_{3.05}$ Firstly, calcined powder of the above dielectric ceramic composition was prepared in the conventional manner. In that case, copper oxide was incorporated into the basic composition in the proportion as shown in Table 1, and calcination was carried out at 750° C. for 2 hours.

The calcined powder was ball-milled with zirconia balls of a 0.5 mm diameter so as to have a mean particle size of 0.2 μm, mixed with 5 wt % of polyvinyl butyral and 50 wt % of an organic solvent, and then formed into green ceramic sheets with a thickness of 30 μm by the Doctor blade process.

Separate from the above, there was prepared an electrode paste E containing $Cu_2O$ as a raw material for internal electrodes in the following manner: Powder of $Cu_2O$ with particle size of 0.2 to 2.0 μm was slurried with 5 wt % of cellulose resin and 30 wt % of an organic solvent by three roll mill.

Also, an electrode paste F containing CuO and Ag as raw materials for internal electrodes was prepared in the same manner as above. In that case, powders of CuO and Ag both having particle size of 0.2 to 2.0 μm were used and mixed in the proportion, by weight, of 97:3.

The thus prepared electrode paste E or F was screen-printed on one flat surface of each green ceramic sheet in the predetermined pattern of internal electrodes, and then the resultant green ceramic sheets were laminated one on another so that electrode paste layers project alternately in the opposite directions to prepare a laminated green ceramic sheet. The laminated green ceramic sheet was then provided at its top and bottom with plural green ceramic layers having no electrode paste layer to form ineffective dielectric layers, and then cut into pieces to form green multilayer capacitor chips.

The thus prepared green capacitor chips were placed on coarse magnesia in a ceramic saggar, heat-treated by cylindrical furnace at a temperature of 180° C. for 5 hours in a reducing atmosphere of hydrogen to reduce copper oxide in the electrode layers, and then fired in a nitrogen atmosphere. The firing was so conducted that the green capacitor chips were heated at a rate of 600° C./hr, maintained at the predetermined firing temperature listed in Table 1 for 20 minutes, and then cooled at a rate of about 600° C./hr. During firing, nitrogen gas containing 0.015% of oxygen was supplied to the furnace at a rate of 30 cm/min to keep the firing atmosphere constant.

The resultant multilayer capacitor chip was polished by barrel to expose ends of internal electrodes on its opposite sides, and then provided on its opposite sides with external electrodes as terminations by applying a copper paste containing powdered metal copper and glass flit, drying it, and then baking the same at 600° C. for 7 minutes in a nitrogen atmosphere.

The dimensions of the resultant multilayer ceramic capacitor are as follows:
Size: 2.8 mm×1.4 mm×0.7 mm
Effective surface area of internal electrode: 1.31 mm²
Thickness of internal electrode: 2.0 μm
Thickness of each dielectric layer: 22 μm
Number of effective dielectric layers: 5
Number of ineffective dielectric layers: 11/one side For each specimen, measurements were made on electric characteristics. Capacitance (Cp) and dielectric loss tangent (tan δ) were measured by applying an alternating voltage of 1 KHz and 1 Vrms. Insulating resistance (I.R.) was determined from a value measured on 1 minute after a DC voltage of 50 V was applied to the capacitor. The life characteristics was determined as the number of degraded capacitors by accelerated life test. The test was carried out by applying a DC voltage of 25 V to the specimen for 500 hours at a temperature of 80° C. and at a humidity of 85% and then measuring its resistance. The number of samples was 16 peaces. The specimen with resistance of not more than $10^8$ Ω was judged as a degraded capacitor. Results are shown in Table 1 together with the composition of dielectric layers, the composition of internal electrodes, the firing temperature, and the content of copper oxides in the dielectric layers of each specimen.

The content of copper oxides in the dielectric layer sandwiched by the internal electrodes of each specimen was determined by the characteristic X-ray wavelength dispersive method. The value listed in Table 1 was a mean value for five points.

In Table 1, specimens with an asterisk (*) are those out of the scope of the present invention, whereas other specimens are those falling within the scope of the present invention.

TABLE 1

| No. | Basic comp. | Add amount of $Cu_2O$ (wt %) | Content of $Cu_2O$ (wt %) | Internal Electrode material | Firing Temp. (°C.) | Cp (nF) | tan δ × $10^{-4}$ 1 KHz | (%) 1 MHz | I.R. (Ω) | Degraded Number (/16) |
|---|---|---|---|---|---|---|---|---|---|---|
| 1* | A | 0.25 | 0.65? | E | 920 | 36.8 | 45 | 230 | 0.7 × $10^{12}$ | 3 |
| 2 | A | 0.30 | 0.67 | E | 920 | 34.4 | 32 | 221 | 1.0 × $10^{12}$ | 1 |
| 3 | A | 1.00 | 1.34 | E | 900 | 33.6 | 48 | 194 | 0.9 × $10^{12}$ | 0 |
| 4 | A | 1.75 | 2.18 | E | 880 | 30.6 | 76 | 289 | 5.0 × $10^{11}$ | 0 |
| 5 | A | 2.00 | 2.35 | E | 860 | 27.9 | 106 | 543 | 0.6 × $10^{11}$ | 1 |
| 6* | B | 0.00 | 0.33 | F | 840 | 26.3 | 47 | 212 | 1.1 × $10^{11}$ | 12 |
| 7 | B | 0.30 | 0.68 | F | 830 | 25.1 | 38 | 238 | 1.5 × $10^{11}$ | 2 |
| 8 | B | 1.00 | 1.41 | F | 830 | 24.0 | 40 | 213 | 2.0 × $10^{11}$ | 0 |
| 9 | B | 1.50 | 1.90 | F | 820 | 22.0 | 65 | 289 | 1.5 × $10^{11}$ | 0 |
| 10* | B | 2.45 | 2.78 | F | 820 | 20.6 | 112 | 467 | 9.0 × $10^{10}$ | 1 |
| 11* | C | 0.20 | 0.64 | E | 880 | 14.6 | 32 | 123 | 7.5 × $10^{11}$ | 4 |
| 12 | C | 0.35 | 0.77 | E | 880 | 13.1 | 40 | 132 | 6.0 × $10^{11}$ | 1 |
| 13 | C | 0.90 | 1.31 | E | 870 | 12.5 | 54 | 143 | 2.5 × $10^{11}$ | 0 |
| 14 | D | 0.65 | 1.07 | E | 870 | 8.4 | 97 | 302 | 1.5 × $10^{12}$ | 0 |
| 15 | D | 1.85 | 2.19 | E | 870 | 8.1 | 114 | 321 | 9.5 × $10^{11}$ | 1 |
| 16* | D | 2.00 | 2.45 | E | 840 | 7.1 | 126 | 342 | 2.0 × $10^{10}$ | 1 |

From the results shown in Table 1, it will be seen that the multilayer ceramic capacitors comprising dielectric layers containing copper oxides in an amount of more than 0.650 wt % but not more than 2.2 wt % are improved in the life characteristics even when they are produced by firing in the neutral atmosphere of nitrogen, although the multilayer capacitors comprising dielectric layers containing more than 2.2 wt % of copper oxides are lowered in capacitance, in dielectric loss and in insulating resistance. Thus, the present invention makes it possible to produce multilayer ceramic capacitors with good life characteristics without causing decrease in the capacitance, in dielectric loss, and in insulating resistance.

From the data for specimens Nos. 6 and 11, it will be seen that the multilayer ceramic capacitors comprising dielectric layers containing not more than 0.650 wt % of copper oxides are poor in the life characteristics when they are produced by firing in a neutral atmosphere of nitrogen.

EXAMPLE 2

Using the basic composition (A) prepared in Example 1 along with 0.7 wt % of $Cu_2O$, there was prepared calcined powder of a ceramic dielectric in the same manner as Example 1. Using the resultant calcined powder and the electrode paste (E) prepared in Example 1, there were prepared multilayer ceramic capacitors in the same manner as Example 1 except for the heat-treatment and firing of the green multilayer capacitor chips.

The heat-treatment of green multilayer capacitor chips were conducted in highly purified hydrogen atmosphere under various conditions listed in Table 2. The firing was carried out at 890° C. in a nitrogen atmosphere with a low content of oxygen, or in an atmosphere composed of gas prepared by removing oxygen from nitrogen gas containing 0.015% oxygen with sponge titanium heated to 700° C. The content of oxygen in the firing atmosphere is listed in Table 1.

For each specimen, measurements were made on electric characteristics in the same manner as Example 1. Results are shown in Table 2 together with the reducing conditions for internal electrodes, the content of oxygen in the firing atmosphere, and the content of copper oxides in the dielectric layers sandwiched by the internal electrodes of each specimen.

In Table 2, an asterisk (*) denotes the multilayer ceramic composition beyond the scope of the present invention.

TABLE 2

| No. | Reducing condition Temp. (°C.) | Reducing condition Hour (Hr) | Oxygen content (%) | Content of $Cu_2O$ (wt %) | Cp (nF) | tan δ × $10^{-4}$ 1 KHz | tan δ (%) 1 MHz | I.R. (Ω) | Degraded Number (/16) |
|---|---|---|---|---|---|---|---|---|---|
| 19* | 80 | 60 | 0.009 | 2.56 | 16.8 | 89 | 287 | $4.5 \times 10^9$ | 16 |
| 20* | 80 | 60 | <1 ppm | 2.41 | 19.6 | 76 | 260 | $1.0 \times 10^{10}$ | 16 |
| 21 | 110 | 32 | 0.009 | 2.13 | 26.8 | 74 | 260 | $1.5 \times 10^{11}$ | 2 |
| 22 | 110 | 32 | <1 ppm | 1.97 | 26.6 | 64 | 241 | $1.8 \times 10^{11}$ | 1 |
| 23* | 180 | 4 | 0.200 | 2.34 | 27.7 | 88 | 290 | $9.0 \times 10^9$ | 6 |
| 24 | 180 | 4 | 0.100 | 1.96 | 30.6 | 43 | 281 | $8.0 \times 10^{10}$ | 1 |
| 25 | 180 | 4 | 0.009 | 1.32 | 31.5 | 21 | 205 | $1.6 \times 10^{12}$ | 0 |
| 26 | 180 | 4 | <1 ppm | 1.31 | 32.2 | 20 | 200 | $2.5 \times 10^{12}$ | 0 |
| 27* | 220 | 1 | 0.200 | 2.49 | 28.8 | 64 | 243 | $3.0 \times 10^{10}$ | 4 |
| 28 | 220 | 1 | 0.100 | 1.78 | 29.6 | 54 | 221 | $1.6 \times 10^{11}$ | 1 |
| 29 | 220 | 1 | <1 ppm | 1.19 | 30.6 | 39 | 217 | $2.5 \times 10^{12}$ | 0 |
| 30* | 300 | 0.3 | 0.200 | 2.32 | 26.3 | 81 | 298 | $4.5 \times 10^{10}$ | 6 |
| 31 | 300 | 0.3 | 0.009 | 1.22 | 31.1 | 48 | 260 | $7.5 \times 10^{11}$ | 0 |
| 32* | 350 | 0.1 | 0.200 | 2.36 | 27.7 | 69 | 271 | $7.5 \times 10^{10}$ | 3 |
| 33* | 350 | 0.1 | 0.009 | 0.51 | 3.2 | 112 | 897 | $1.9 \times 10^{12}$ | 9 |

As will be understood from the results shown in Table 2, the multilayer ceramic capacitors are improved in the life characteristics, without causing decrease in capacitance, in dielectric loss and in insulating resistance, by carrying out the heat-treatment at a temperature within the range of 110° C. to 300° C., and then firing in a neutral atmosphere with the oxygen content of not more than 0.100%.

Also, it will be understood that if the reduction of internal electrodes is carried out at a temperature of less than 110° C. or at a temperature of more than 300° C., or if the firing is carried out in an atmosphere with the oxygen content of more than 0.100%, the life characteristic of the produced multilayer ceramic capacitors becomes considerably lowered.

What is claimed is:

1. A multilayer ceramic capacitor comprising plural ceramic dielectric layers laminated one on another, and at least two internal electrodes separated by the ceramic dielectric layer and alternately terminated at the opposite sides of the laminated ceramic dielectric layers, said ceramic dielectric layers being composed of a complex oxide including a component (A), a component (B), and copper, said component (A) being at least one element selected from the group consisting of Pb, Ca, Sr and Ba, but containing Pb at the least, said component (B) being at least two elements selected from the group consisting of Mg, Ni, Zn, Ti, Ta, Nb and W, the molar ratio of said component (A) to component (B) being not less than 0.985, but not more than 1.110, the content of said copper in said complex oxide being more than 0.650 wt %, but not more than 2.200 wt % in terms of $Cu_2O$, said internal electrodes being composed of copper or an alloy mainly comprising copper.

* * * * *